(12) United States Patent
Ikeda et al.

(10) Patent No.: US 8,887,877 B2
(45) Date of Patent: Nov. 18, 2014

(54) DRUM BRAKE WITH AUTOMATIC SHOE CLEARANCE ADJUSTMENT APPARATUS

(75) Inventors: Takashi Ikeda, Toyota (JP); Yusuke Taniguchi, Gunma (JP)

(73) Assignee: Nisshinbo Brake Inc., Tokyo (JP)

( * ) Notice: Subject to any disclaimer, the term of this patent is extended or adjusted under 35 U.S.C. 154(b) by 812 days.

(21) Appl. No.: 12/787,186

(22) Filed: May 25, 2010

(65) Prior Publication Data

US 2011/0120819 A1    May 26, 2011

(30) Foreign Application Priority Data

May 28, 2009    (JP) .................................. 2009-128841

(51) Int. Cl.
F16D 55/00    (2006.01)
F16D 65/54    (2006.01)
F16D 65/58    (2006.01)

(52) U.S. Cl.
CPC .............. F16D 65/546 (2013.01); F16D 65/58 (2013.01)
USPC ..................................................... 188/79.51

(58) Field of Classification Search
USPC .......... 188/79.56, 79.55, 79.51, 79.54, 79.52, 188/71.7
See application file for complete search history.

(56) References Cited

U.S. PATENT DOCUMENTS

| | | | | |
|---|---|---|---|---|
| 3,991,861 A * | 11/1976 | Hayashida | ................ | 188/79.54 |
| 4,595,082 A * | 6/1986 | Le Deit | ..................... | 188/79.54 |
| 4,804,072 A * | 2/1989 | Michoux et al. | ........... | 188/79.52 |
| 5,752,586 A * | 5/1998 | Evans | ..................... | 188/1.11 W |
| 6,568,513 B1 * | 5/2003 | Doolittle et al. | .............. | 188/331 |
| 7,070,025 B2 * | 7/2006 | Maehara | .................... | 188/79.56 |
| 2003/0183465 A1 * | 10/2003 | Ikeda | ............................ | 188/325 |
| 2005/0241895 A1 * | 11/2005 | Peasley | ...................... | 188/79.55 |
| 2006/0144658 A1 * | 7/2006 | Tessitore et al. | ............. | 188/325 |

FOREIGN PATENT DOCUMENTS

EP    0462731 A2    12/1991
JP    59-126127 A    7/1984

* cited by examiner

*Primary Examiner* — Robert A Siconolfi
*Assistant Examiner* — James Hsiao
(74) *Attorney, Agent, or Firm* — Tracy M. Helms; Apex Juris, pllc (57) ABSTRACT

To provide the drum brake with the automatic shoe clearance adjustment apparatus to reduce the cost of the drum brake as reducing the number of components. The first engagement portion is provided between the brake lever and the strut body to engage the brake lever and the strut body without operating the service brake, and the second engagement portion is provided also to engage the brake lever and the strut body while automatically adjusting the shoe clearance.

6 Claims, 10 Drawing Sheets

DRUM BRAKE WITH AUTOMATIC SHOE CLEARANCE ADJUSTMENT APPARATUS

CROSS-REFERENCE TO RELATED APPLICATION(S) AND CLAIM OF PRIORITY

The present application claims the benefit under 35 U.S.C. section 119(a) of Japanese Patent Application filed in the Japan Patent Office on May 28, 2009 and assigned serial number 2009-128841, the disclosure of which is incorporated herein by reference.

FIELD OF INVENTION

This invention relates to a drum brake, more particularly to a drum brake equipped with a one-shot type automatic shoe clearance adjustment apparatus.

BACKGROUND OF THE INVENTION

According to Patent Literature 1, a widely known drum brake is based on a device in which a strut is arranged in a space between one facing ends of a pair of brake shoes, and a quadrant is positioned at one end of the strut body such that the quadrant is rotatable and movably pivoted in a longitudinal direction of the strut body, the quadrant having a shoe engagement portion (projecting arm) formed at one end thereof engaging, with a predetermined gap, a quadrant engagement portion (quadrant engagement hole) formed at a shoe web of one brake shoe, and the quadrant rotating to adjust a brake shoe clearance automatically when the amount of brake shoe outward movement exceeds a predetermined value, where an anti-rattle spring is extended between the strut and the other brake shoe and a quadrant spring is extended between the strut body and the quadrant.

Also, according to Patent Literature 2, another widely known drum brake is based on a device in which a shoe engaging portion of the quadrant is a projection from one side surface of the quadrant, and a quadrant engagement portion of the shoe web is a notched groove formed on the shoe web.

In this structure, there must be two springs, i.e., an anti-rattle spring functioning as a first adjuster spring and a quadrant spring functioning as a second adjuster spring, which increases the parts cost and the entire manufacturing cost because of an additional assembly process required for the spring installation.

[Patent Literature 1] Japanese Provisional Patent Publication No. 59-126127

[Patent Literature 2] European Patent Publication No. 0462731

SUMMARY OF THE INVENTION

This invention was made to resolve the above-identified problems and an object of this invention is to provide a drum brake with only one adjuster spring based on a conventional drum brake equipped with a one shot type automatic shoe clearance adjustment apparatus at one adjacent end of the brake shoe, a brake lever, and a lever return spring that urges the brake lever in a cable releasing direction.

This invention is the drum brake, comprising: (a) an automatic shoe clearance adjustment apparatus, the shoe clearance adjustment apparatus including (1) a strut body being positioned between a pair of facing ends of a pair of brake shoes, (2) a quadrant being pivotally positioned, while movable in a longitudinal direction of the strut body, at one end of the strut, the quadrant having a shoe engagement portion engaging, with a predetermined gap, a quadrant engagement portion formed on a shoe web of one brake shoe, and being rotatable to automatically adjust a brake shoe clearance when the amount of brake shoe outward movement exceeds a predetermined value; (b) a brake lever which is positioned at the other brake shoe side and mechanically operates the pair of brake shoes in cooperation with the automatic shoe clearance adjustment apparatus; (c) a brake cable connected to a free end of the brake lever; and (d) a spring urging the brake lever in a cable releasing direction, wherein a first engagement portion and a second engagement portions are formed between the brake lever and the strut body, while not operating the service brake, the brake lever abuts against the strut at the first engagement position to establish an engagement therebetween, and then the brake lever departs 1 from the strut at the second engagement portion to establish a disengagement therebetween, and also while automatically adjusting the shoe clearance, the brake lever leaves from the strut at the first engagement portion therebetween, and then the brake lever abuts against the strut at the second engagement portion, and thereby being capable of following the strut body to the other brake shoe via the brake lever while automatically adjusting the shoe clearance.

Also, based on the above-described drum brake device, this drum brake device uses the spring for urging the brake lever in a cable releasing direction is a cable return spring which is coiled on the inner cable of the brake cable.

Furthermore, based on the above-described drum brake device, this drum brake device uses the spring for urging the brake lever in a cable releasing direction is a lever return spring which is positioned between the other brake shoe and the brake lever.

According to this invention, the spring urging the brake lever in the cable releasing direction also has a function of the anti-rattle spring in the conventional automatic shoe clearance adjustment apparatus consisting of such as the quadrant spring and the anti-rattle spring, which reduces the number of springs required and also the assembly process thereof and reduces the cost of the drum brake

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE PREFERRED EMBODIMENT

First Embodiment

The first embodiment of this invention will be explained with reference to FIGS. 1-4 in the following sections.

<1> Drum Brake Structure

Figure 1:
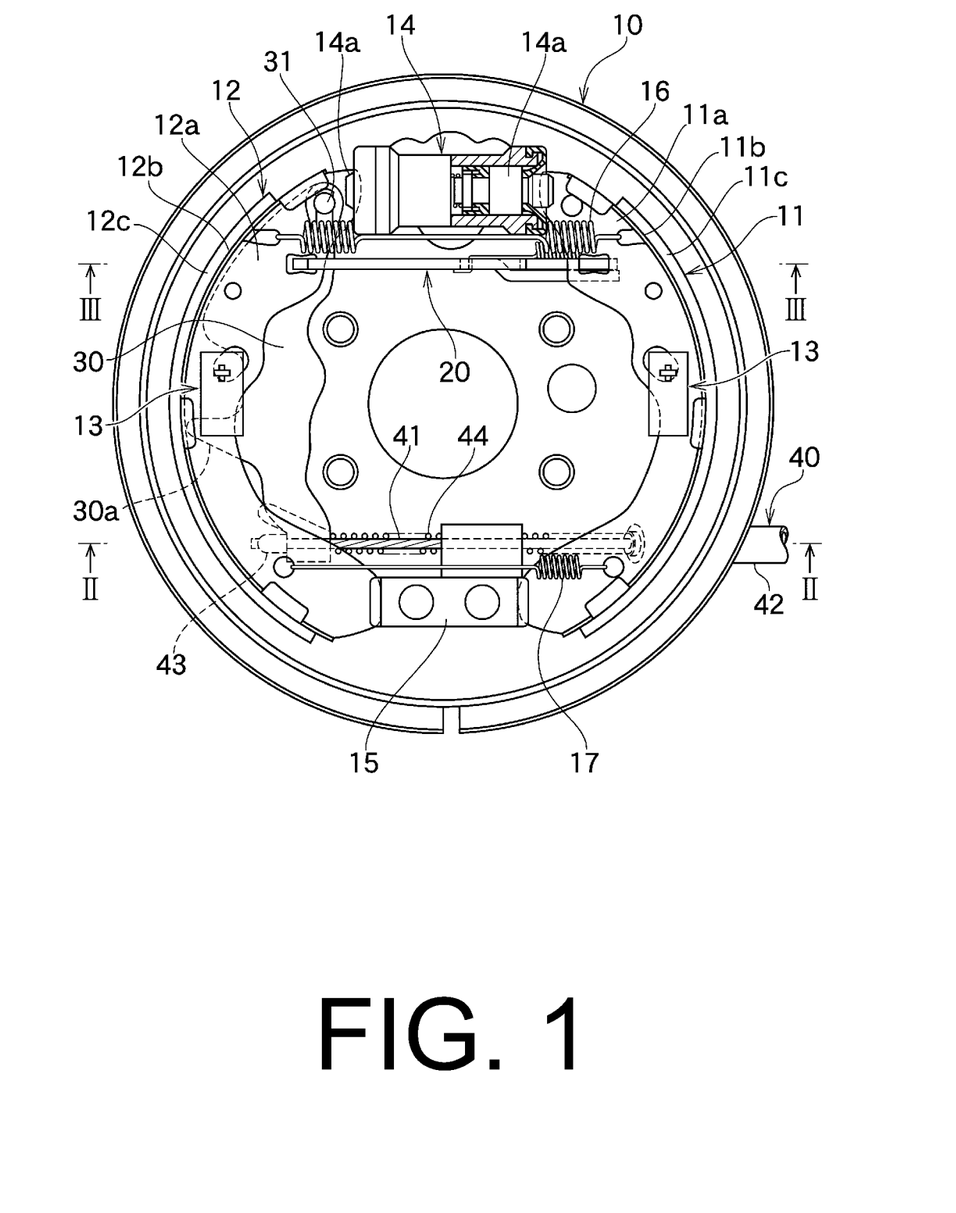
FIG. 1 is a plan view of the drum brake with the automatic shoe clearance adjustment in relation to a first embodiment of this invention.
Figure 2:
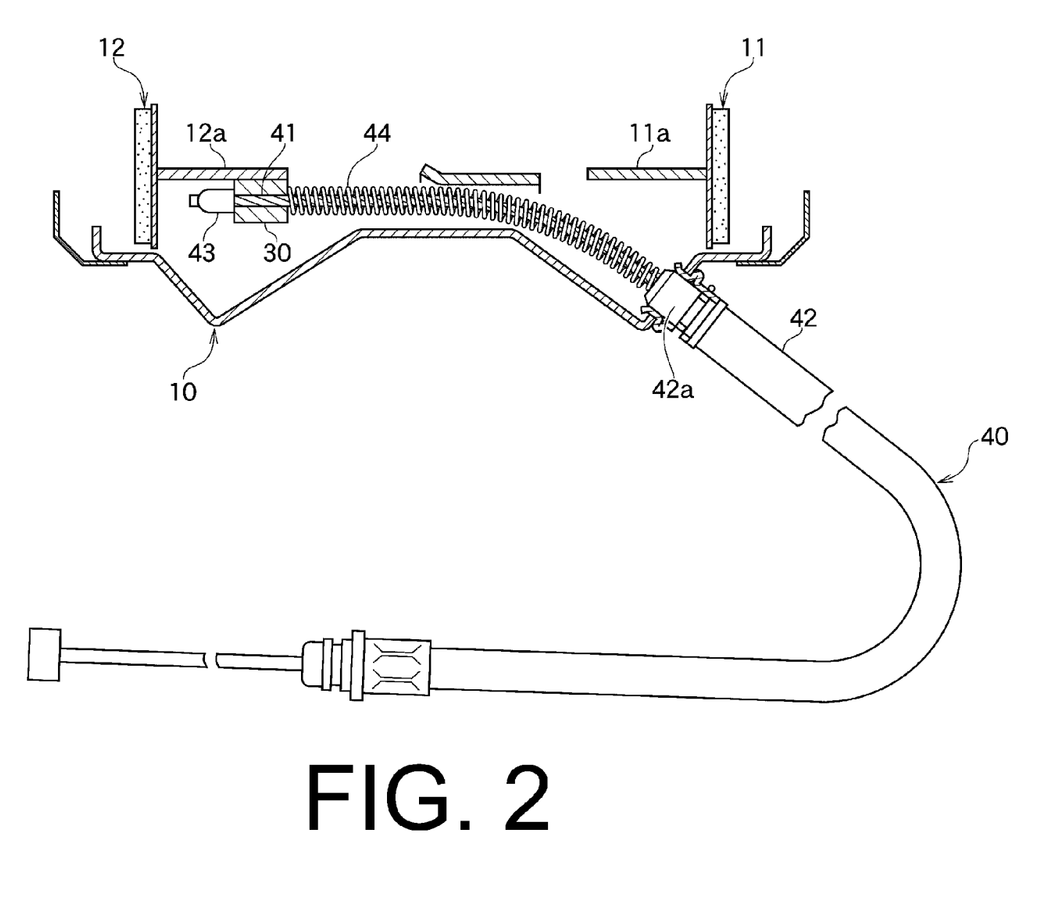
FIG. 2 is a cross section view of FIG. 1 taken along the line II-II.
Figure 3:
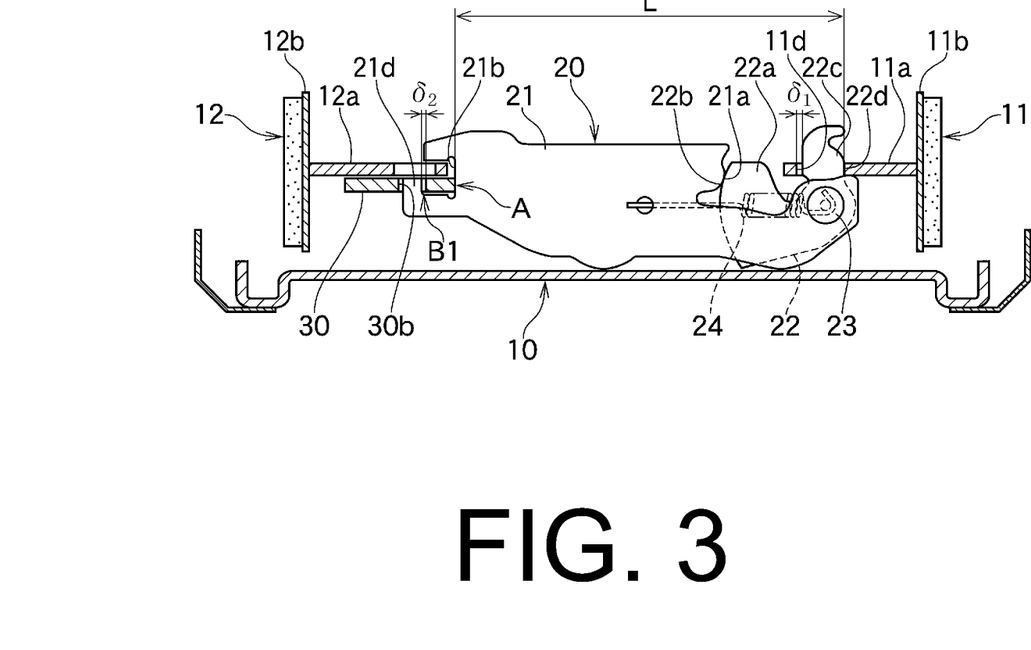
FIG. 3 is a cross section view of FIG. 1 taken along the line III-III.

FIG. 1 shows a plan view of a leading-trailing type (LT type) drum brake device equipped with a parking brake mechanism as well as a one shot type automatic shoe clearance adjustment apparatus, and FIGS. 2 and 3 show cross section views thereof.

In the drum brake of FIG. 1, a back plate 10 is fixed to a stationary portion of a vehicle such as by bolts, and a pair of brake shoes 11, 12 are slidably supported by conventional shoe hold mechanisms 13, 13.

The pair of brake shoes 11 and 12, which are cross-sectionally in T-shape when shoe webs 11a, 12a are connected with shoe rims 11b, 12b respectively and linings 11c, 12c are fixed on external surfaces of the shoe rims 11b, 12b respectively, have one facing ends (upper facing ends in FIG. 1) engage pistons 14a, 14a of a wheel cylinder 14 functioning as a shoe expander for service brake and the other facing ends (lower facing ends in FIG. 1) are supported respectively by an anchor 15 fixed on the back plate 10.

The wheel cylinder 14 is fixed to the back plate 10 such as by bolts, and the piston 14a, 14a thereof stroke to move together with expanding or contracting movement of one facing pair of the brake shoes 11, 12.

Shoe return springs 16, 17 are extended between the pair of brake shoes 11, 12 so that the brake shoes 11, 12 are urged in the contracting directions.

A strut 20 constructing the automatic shoe adjustment apparatus is arranged between both brake shoes 11, 12 adjacent to the wheel cylinder 14.

A brake lever 30 for the parking brake is superposed on the shoe web 12a of the other brake shoe 12, and a proximal end (an upper end in FIG. 1) is pivotally supported on one end of the shoe web 12a by a lever pin 31. A brake cable 40 is connected to a free end (a lower end in FIG. 1) of the brake lever 30.

The brake cable 40 has components such as an inner cable 41 and an outer casing 42. A cable end 43 which connects to the brake lever 30 is fixed on a top of the inner cable 41.

The outer casing 42 is fixed on the back plate 10

A cable return spring 44 coiled on the inner cable 41 is compressed between the back plate 10 (a casing cap 42a of the outer casing 42 in this embodiment) and a free end of the brake lever 30.

The brake lever 30 is being urged and rotated in the cable releasing direction around the lever pin 31 with a spring force of the cable return spring 44. The rotation of the brake lever 30 in the cable releasing direction (a clockwise rotation in FIG. 1) is restricted to a certain position as abutting a stopper 30a of the brake lever 30 against the shoe rim 12b.

<2> Automatic Shoe Clearance Adjustment Apparatus

As shown in FIG. 3, the strut 20 is comprised of a flat strut body 21, a quadrant 22, a pin 23 fixed to the quadrant 22, and a quadrant spring 24. The strut 20, the brake lever 30, and the cable return spring 44 constitutes the automatic shoe clearance adjustment apparatus.

The strut body 21 has adjustment teeth 21a formed in an intermediate portion thereof. The quadrant 22 is pivotally supported at a right side of the strut body 21 while being movable along a flat surface in a longitudinal direction of the strut body 21 via the pin 23.

Adjustment teeth 22b formed on the periphery of a fan-shaped arm 22a of the quadrant 22, engage with the adjustment teeth 21a of the strut body 21, and the quadrant spring 24, extended between the strut body 21 and the pin 23, is urged in a direction to maintain the engagement between both adjustment teeth 21a and 22b.

A relation between the installation load of the quadrant spring 24 and the cable return spring 44 is such that the quadrant spring 24, while automatically adjusting the shoe clearance, extends to disengage both adjustment teeth 21a and 22b.

Also, a projecting arm 22c, having a cam surface 22d, is formed at a right side of the quadrant 22, and the projecting arm 22c freely fits in a quadrant engagement hole 11d formed on the shoe web 11a of one brake shoe 11 with a predetermined gap $\delta_1$ from an inner surface of a quadrant engagement hole 11d at an inner side of the brake, while the cam surface 22d abuts against an inner surface of the quadrant hole 11d at an outer side of the brake. The quadrant 22 rotates when the amount of outward movement of the brake shoe 11, 12 exceeds the predetermined value as described later and automatically adjusts the clearance (shoe clearance) between the brake shoes 11, 12 and the brake drum (not shown in the figures).

The shoe web 12a of the other brake shoe 12 and the brake lever 30 fit in a notched groove 21b formed at a left end of the strut body 21.

The brake lever 30, which receives a spring force of the shoe return springs 16, 17, via a stopper 30a abutting against the shoe rim 12b, abuts against and is supported by the bottom surface of the notched groove 21b. A first engagement portion A is comprised of the bottom surface of the notched groove 21b of the strut body 21 and the side surface of the brake lever 30 at the inner side of the brake.

A projecting engagement arm 21d which extends toward the notched groove 21b is formed at the left side of the strut body 21. The engagement arm 21d freely fits in a rectangular engagement hole 30b formed on the brake lever 30 with the predetermined gap $\delta_2$ from the inner surface of the engagement hole 30b at the inner side of the brake.

A second engagement portion B1 is comprised of the engagement arm 21b and the inner surface of the engagement hole 30b at the inner side of the brake.

That is, the second engagement portion B1 is arranged between the strut body 21 and the brake lever 30 rather than the conventional engagement portion (the first engagement portion A) where the strut 21 engages the brake lever 30.

By arranging the engagement portion B1 between the strut body 21 and the brake lever 30, as described later, abutment between the strut 20 and the brake lever 30 can be maintained while automatically adjusting the shoe clearance. In other words, the strut 20 follows the other brake shoe 12 via the brake lever 30 while automatically adjusting the shoe clearance. Accordingly, the cable return spring 44 also functions as the conventional anti-rattle spring, and this invention can eliminate the conventional anti-rattle spring from the conventional art requiring both the quadrant spring and the anti-rattle spring.

<3> Automatic Shoe Clearance Adjustment Operation

Figure 4:
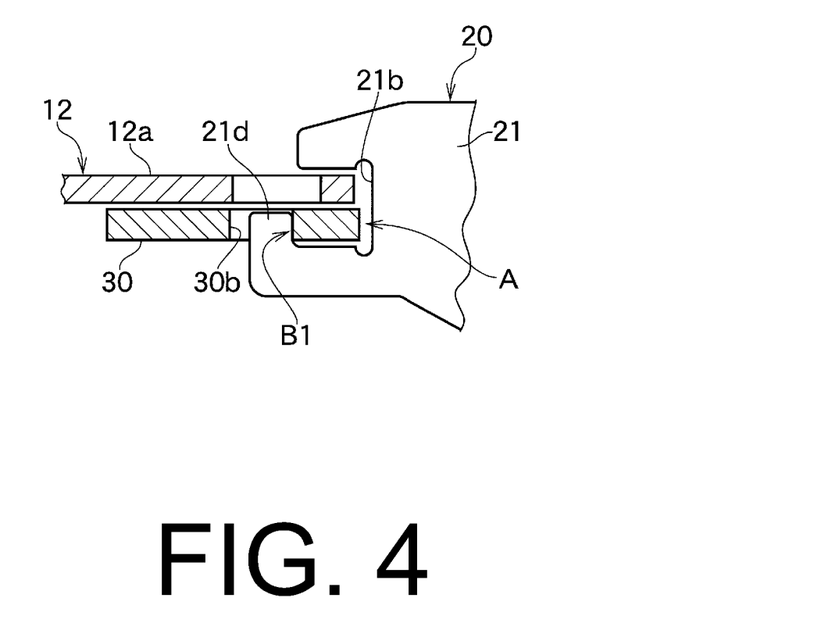
FIG. 4 is a cross section view of the first and second engagement portions of the strut and the brake lever while automatically adjusting the shoe clearance in the first embodiment.

As making an outward movement of the pair of the brake shoes 11, 12 by the service brake operation, the first engagement portion A between the strut body 21 and the brake lever 30 departs therefrom.

As the linings 11c, 12c wear, when the amount of the outward movement of the pair of the brake shoes 11, 12 exceeds the gap $\delta_1$ between the projecting arm 22c of the quadrant 22 and quadrant engagement hole 11d of the shoe web 11a and the gap $\delta_2$ between the engagement arm 21d and the engagement hole 30b, the engagement arm 21d abuts against the inner surface of the engagement hole 30b at the inner side of the brake, thereby establishing the abutment of the second engagement portion B1. At this time, by an operation force on the projecting arm 22c, a force that urges the quadrant 22 to rotate in a clockwise rotational is generated.

As described above, the relation of the installation load between the quadrant spring 24 and the cable return spring 44 is set so that the quadrant spring 24 extends to disengage both adjustment teeth 21a and 22b while automatically adjusting the shoe clearance, and therefore the engagement condition between the adjustment teeth 21a and 22b change.

At this time, the point of abutment between the cam surface 22d of the projecting arm 22c and the quadrant engagement hole 11d of the shoe web 11a changes to the extent of the engagement change to extend a distance L between the inner surface of the quadrant engagement hole 11d at the outer side of the brake supported by the projecting arm 22c and the bottom surface of the notched groove 21b of the strut body 21 supporting the side surface of the brake lever 30 at the inner side of the brake, thereby maintaining approximately constant shoe clearance. In other words, an effective practical length of the strut 20 can be extended to shorten the gap between the brake shoes 11, 12 and the brake drum (not shown in the figures), thereby constantly maintaining the shoe clearance. Here, if the wear of the linings 11c, 12c is normal, the engagement between the adjustment teeth 21a and 22b changes by one tooth.

Also, the abutment of the first engagement portion A, while operating the parking brake, is maintained, and the engagement arm 21d of the strut body 21 and the engagement hole 30b of the brake lever 30, both forming the second engagement portion B1, are remained freely fitting with each other with the predetermined gap $\delta_2$. Accordingly, the strut 20 simply moves toward the right in the figures together with one brake shoe 11, which does not give any effect on the automatic shoe clearance adjustment.

In this embodiment, by forming the second engagement portion B1 between the strut body 21 and the brake lever 30, although the conventional device required both quadrant spring and the anti-rattle spring, the cable return spring of this invention can also function as the anti-rattle spring, and therefore the number of springs and the assembly step can be reduced, which automatically reduce the cost of the drum brake.

Modified Embodiment of First Embodiment

Modified embodiment of the first embodiment and another embodiment will be explained next, where the same reference numbers will be assigned to identical members as in the first embodiment, and the explanation will be omitted.

Figure 5:
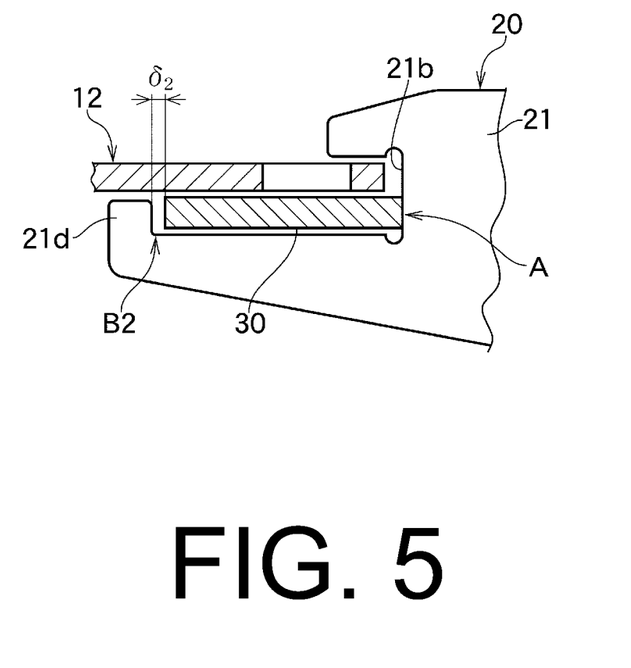
FIG. 5 is a cross section view of the first and second engagement portions of the strut and the brake lever in relation to a modified embodiment of the first embodiment.

FIG. 5 illustrates a modified embodiment of the first embodiment where the brake lever 30 fits between the bottom surface of the left notched groove 21b of the strut body 21 and the engagement arm 21d of the strut body 21 with the predetermined gap $\delta_2$. In this embodiment, the second engagement portion B2 is comprised of the inner surface of the engagement arm 21d at the inner side of the brake and the side surface of the brake lever 30 at the outer side of the brake. Just like the first embodiment, a first engagement portion A is comprised of the bottom surface of the notched groove 21b of the strut body 21 and the side surface of the brake lever 30 at the inner side of the brake.

The automatic shoe clearance adjustment operation is same as the first embodiment and therefore the explanation of which is omitted here.

In this modified embodiment, the engagement hole 30b is not formed in the brake lever 30, thereby eliminating the possibility of losing the strength and stiffness.

Second Embodiment

Figure 7:
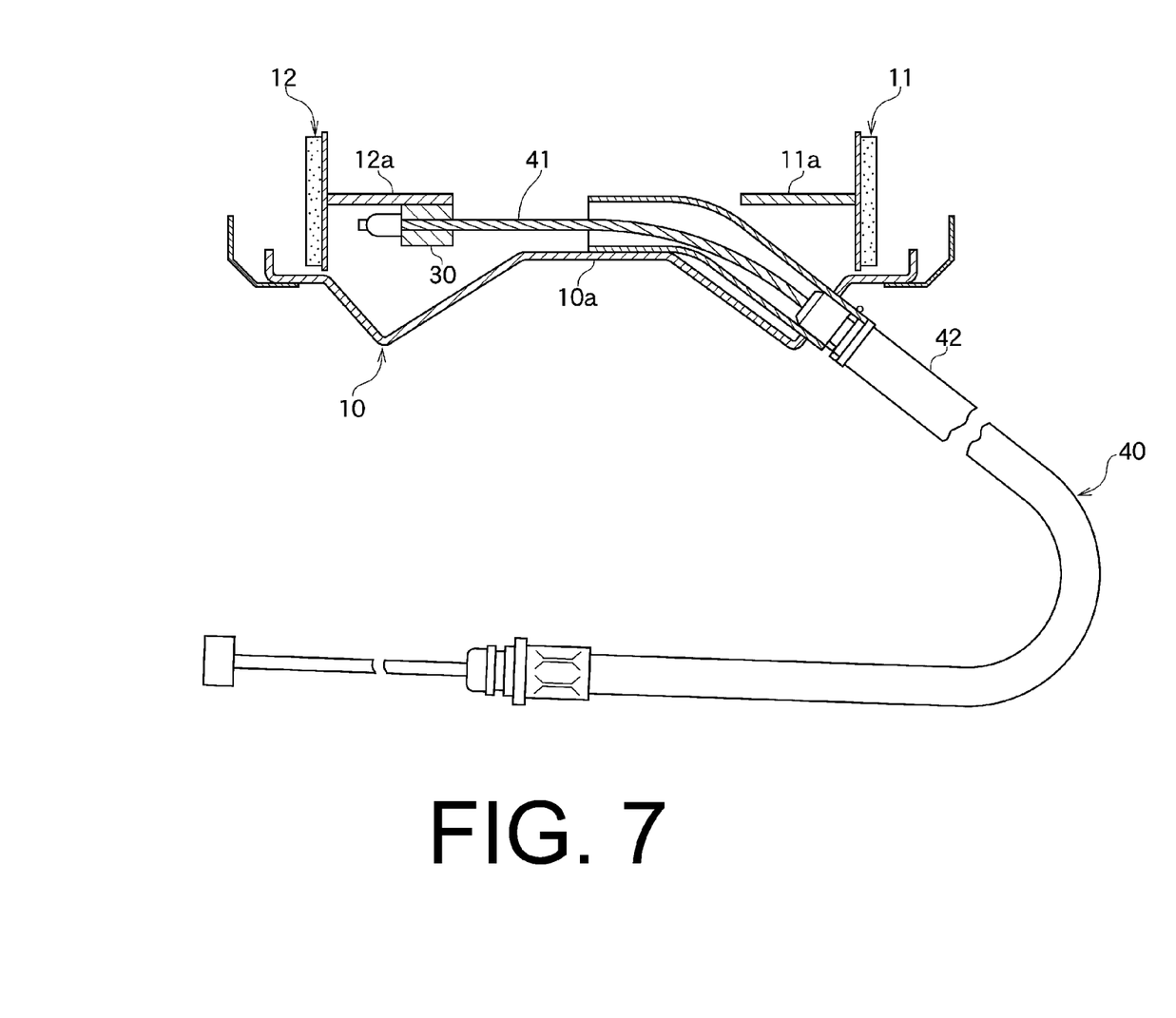
FIG. 7 is a cross section view of FIG. 6 taken along the line VII-VII.
Figure 8:
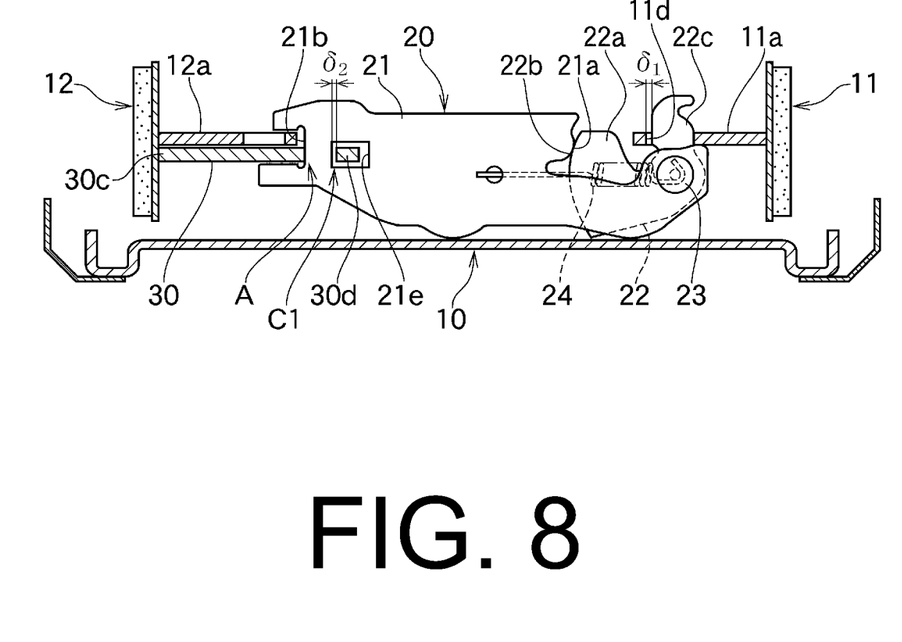
FIG. 8 is a cross section view of FIG. 6 taken along the line VIII-VIII.
Figure 9:
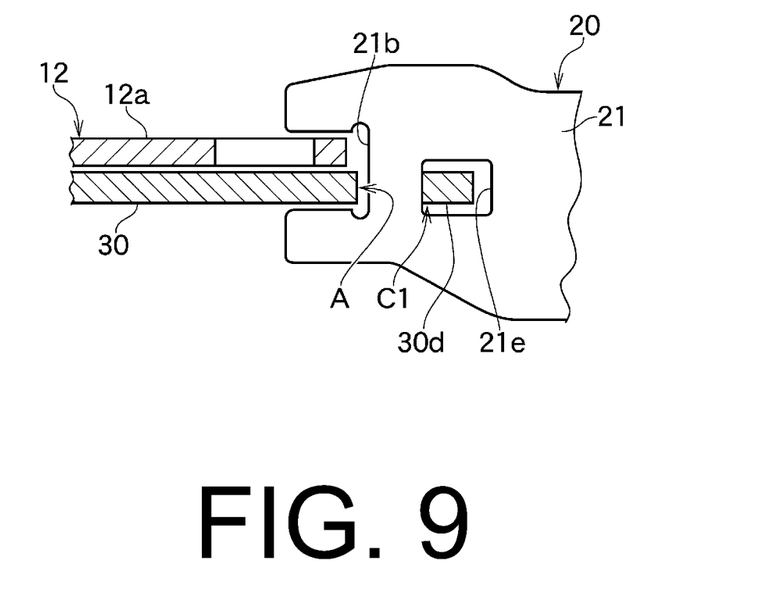
FIG. 9 is a cross section view of the first and second engagement portions of the strut and the brake lever while automatically adjusting the shoe clearance in the second embodiment.

A second embodiment will be explained next with reference to FIGS. 6-9, which shows a drum brake in which a lever return spring 45 is extended between the shoe web 12a of the other brake shoe 12 and the brake lever 30. Here, FIGS. 6-8 illustrate the drum brake without operating the service brake, and FIG. 9 illustrates the drum brake while operating the service brake.

<1> Lever Return Spring

Figure 6:
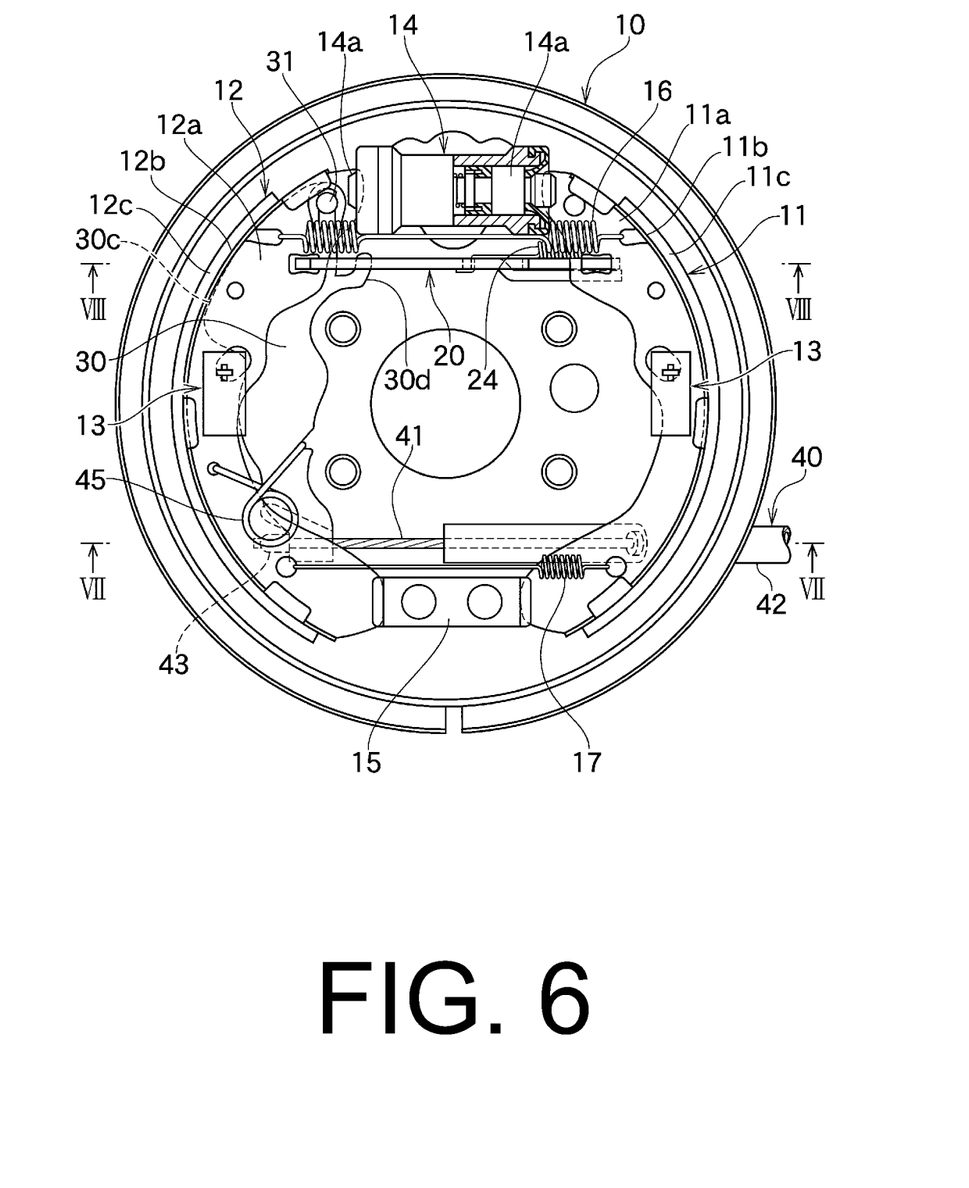
FIG. 6 is a plan view of the drum brake with the automatic shoe clearance adjustment in relation to a second embodiment of this invention.

The lever return spring 45, as shown in FIG. 6, is a helical torsion spring, and one arm is hooked on the shoe web 12a of the other brake shoe 12 while the other arm is hooked on the brake lever 30.

The brake lever 30 is constantly urged around the lever pin 31 toward the cable release direction by the spring force of the lever return spring 45, and an abutting portion 30c abuts against the shoe rim 12b.

<2> Brake Cable

As shown in FIG. 7, the brake cable 40 is comprised of the inner cable 41 and the outer casing 42, and the outer casing 42 is fixed to the back plate 10.

<3> First Engagement Portion

As illustrated in FIG. 8, the brake lever 30, which receives a spring force of the shoe return springs 16, 17 via an abutment portion 30c, abuts against and is supported by the bottom surface of the notched groove 21. A first engagement portion A is comprised of the bottom surface of the notched groove 21b of the strut body 21 and the side surface of the brake lever 30 at the inner side of the brake.

<4> Second Engagement Portion

An engagement hole 21e is formed at the right side of the notched groove 21b of the strut body 2. The engagement arm 30d is extending, at the inner side of the brake, from the main body of the brake lever 30 in a direction to penetrate a surface of the strut body 21. The engagement arm 30d freely fits in the engagement hole 21e, and while the first engagement portion A is abutting, the predetermined gap $\delta_2$ exists between the side surface of the engagement arm 30d at the outer side of the brake and the inner surface of the engagement hole 21e of the strut body 21 at the brake outer side. A second engagement portion C1 is comprised of the side surface, at the outer side of the brake, of the engagement arm 30d and the inner surface, at the outer side of the brake, of the engagement hole 21e.

As shown in FIG. 9, while automatically adjusting the shoe clearance, the first engagement portion A departs and then the second engagement portion C1 abuts and maintains the abutting condition.

The operation of automatically adjusting the shoe clearance is the same as the first and second embodiments and therefore the explanation of which is omitted here.

In addition to the advantage of the first embodiment, this second embodiment has an advantage of improving the assembleability of the other brake shoe 12 integrated with the brake lever 30.

Modified Embodiment of Second Embodiment

Figure 10:
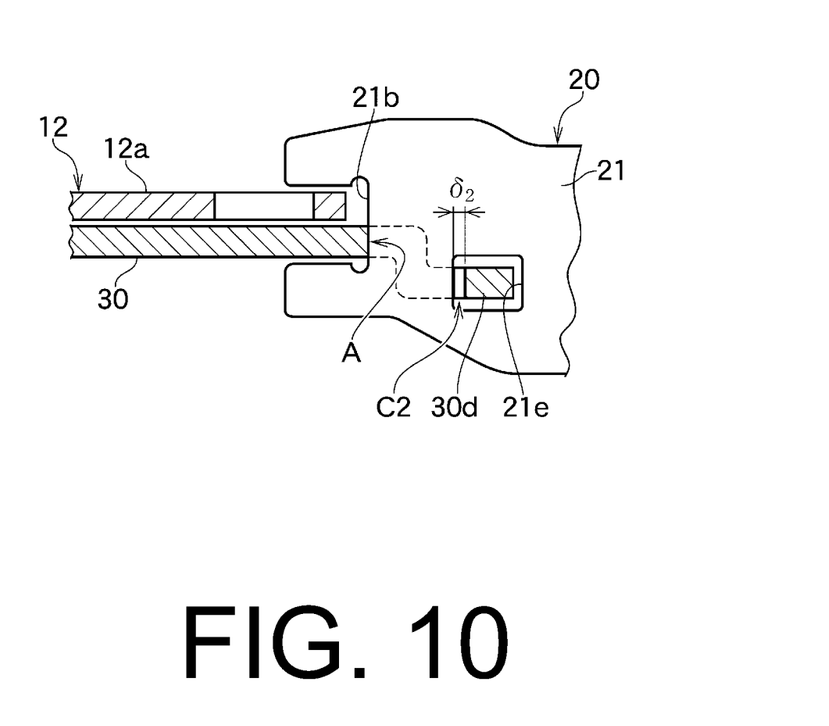
FIG. 10 is a cross section view of the first and second engagement portions of the strut and the brake lever in relation to a modified embodiment of the second embodiment.

FIG. 10 illustrates the modified embodiment of the second embodiment, where the first engagement portion and the second engagement portion, which are provided between the strut body 21 and the brake lever 30, are off-set in a vehicle axial direction. Here, FIG. 10 shows the condition without operating the service brake.

In this modified embodiment, the brake lever 30 is bent to form a crank-shape in cross section, and the first engagement portion A, comprised of the bottom surface of the notched groove 21b of the strut body 21 and the side surface of the main body of the brake lever 30 at the inner side of the brake and a second engagement portion C2 comprised of the side surface of the engagement arm 30d at the outer side of the brake and the inner surface of the engagement hole 21e at the outer side of the brake are off-set in the brake axial direction.

In this modified embodiment, there is no engagement hole 21e on an extension line of the first engagement portion A receiving the force while operating the parking brake, which gives advantages in strength and stiffness.

An arrangement of the spring urging the brake lever 30 in the cable releasing direction is not limited to what is described in the first and the second embodiments, and the spring is designed to urge the brake lever 30 in the cable release direction so as for the brake lever 30 to abut against the brake shoe 12. Also, the first engagement portion A and the second engagement portions B1, B2, C1, and C2 between the strut body 21 and the brake lever 30 are not limited to what is described in the first and the second embodiment, as long as the strut body 21 and the brake lever 30 maintain the abutment at the first engagement portion without operating the service brake, and the strut body 21 and the brake lever 30 maintains the abutment while automatically adjusting the shoe clearance.

Also, combinations of the spring, the first engagement portion A, and the second engagement portions B1, B2, C1, and C2 are not limited to what is described in the first and the second embodiments, and alternative combinations are possible.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What we claim is:

1. A drum brake, comprising:
   (a) an automatic shoe clearance adjustment apparatus including
      (1) a strut which is provided between a pair of facing ends of a pair of brake shoes, said strut having
         (i) a strut body with adjustment teeth,
         (ii) a quadrant with adjustment teeth, pivotally mounted on said strut body at one end of said strut body so as to be movable in a longitudinal direction of said strut body, said quadrant has a shoe engagement portion engaging a quadrant engagement portion formed on a shoe web of one brake shoe with a predetermined first gap, so as to be rotatable to automatically adjust a brake shoe clearance when the amount of brake shoe outward movement exceeds a predetermined value, and
         (iii) a quadrant spring urging said quadrant toward said strut body so that said adjustment teeth of said strut body and quadrant resiliently engage each other;
      (2) a brake lever which is mounted on the other brake shoe so as to mechanically operate said pair of brake shoes in cooperation with said strut; and
      (3) a spring which urges said brake lever in a cable releasing direction;
   (b) a shoe return spring which urges said brake shoes for returning said brake shoes to an original position; and
   (c) a brake cable which is connected to a free end of said brake lever,
   wherein
   a first engagement portion is provided between said brake lever and said strut body and a different second engagement portion is also provided between said brake lever and said strut body
   so that said brake lever abuts against said strut body at said first engagement position, and then said brake lever departs from said strut body at said second engagement portion with a predetermined second gap that defines said predetermined value in cooperation with said predetermined first gap, when the service brake is not operated, and
   that said brake lever leaves from said strut body at said first engagement portion, and then said brake lever abuts against said strut body at said second engagement portion, and therefore said strut body can follow said the other brake shoe via said brake lever while automatically adjusting the brake shoe clearance.

2. The drum brake according to claim 1, wherein said spring for urging said brake lever in a cable releasing direction is a cable return spring which is coiled on said inner cable of said brake cable.

3. The drum brake according to claim 1, wherein said spring for urging said brake lever in a cable releasing direction is a lever return spring which is positioned between said the other brake shoe and said brake lever.

4. The drum brake according to claim 1, wherein said second engagement portion is comprised of a projection formed on said brake lever and a hole formed on said strut body, and said second engagement portion and said first engagement portion are off-set in a vehicle axial direction.

5. The drum brake according to claim 2, wherein said second engagement portion is comprised of a projection formed on said brake lever and a hole formed on said strut body, and said second engagement portion and said first engagement portion are off-set in a vehicle axial direction.

6. The drum brake according to claim 3, wherein said second engagement portion is comprised of a projection formed on said brake lever and a hole formed on said strut body, and said second engagement portion and said first engagement portion are off-set in a vehicle axial direction.

* * * * *